Dec. 21, 1948.   T. J. ARBRON   2,456,853
MOLD COATING METHOD AND APPARATUS
Filed June 19, 1946
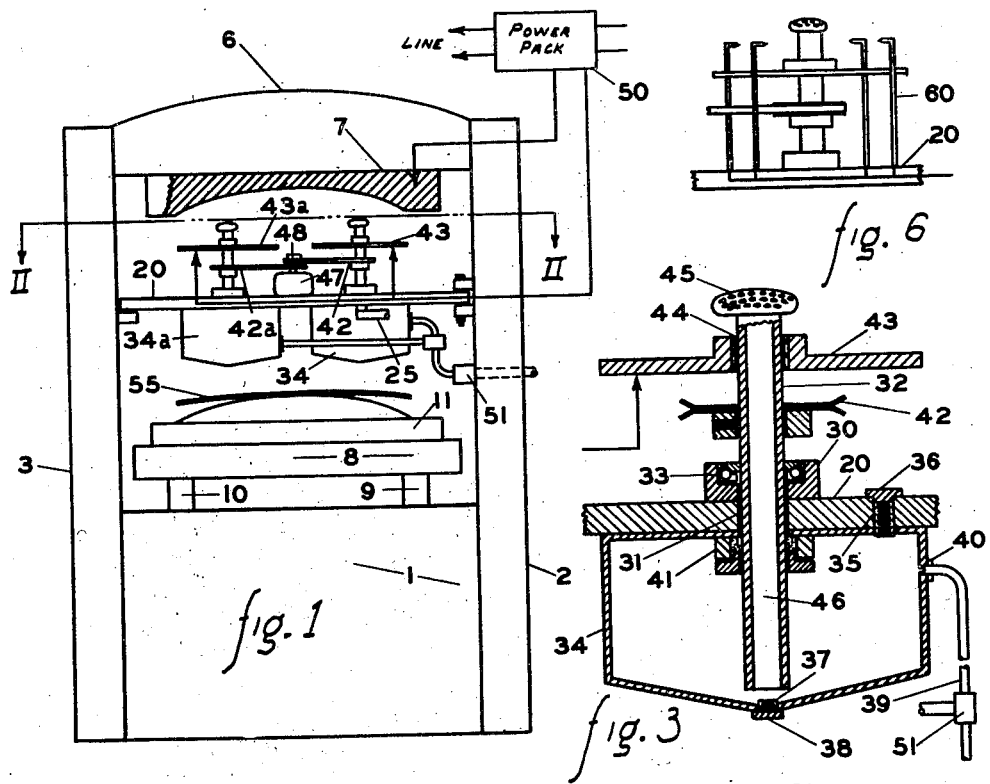
INVENTOR.
THOMAS J. ARBRON Patented Dec. 21, 1948

2,456,853

UNITED STATES PATENT OFFICE 2,456,853

MOLD COATING METHOD AND APPARATUS

Thomas J. Arbron, Romeo, Mich.

Application June 19, 1946, Serial No. 677,832

10 Claims. (Cl. 18—1)

1

This invention refers to a method, and apparatus for practicing said method, of coating a surface of a mold prior to placing a mold charge therein, and particularly contemplates such a coating which is to be transferred in the molding process to the material being molded by which it will constitute a coating on a finished molded product.

In fabricating articles from plastics, and particularly laminated plastics, it is often desirable that a coating of resinous material be placed on the finished article, which coating is usually of a material different from the base material of the article itself. To the extent now practiced this is conventionally done by spraying, dipping or otherwise applying the coating material onto an otherwise finished base material. These procedures, of course, require separate procedural steps, and further requires drying, baking or some other hardening process.

A particular problem develops in utilizing laminated plastics materials to form an article having a surface curved in two directions, and particularly articles having two or more curved surfaces meeting each other such as, for example, a serving tray having curved sides meeting at the corners. This difficulty arises in that the laminae which are assembled and compressed together to form the finished product are flat sheets which when curved in two or more directions necessarily fold onto themselves and cause unsightly wrinkles. While such wrinkles can be, and are, covered by some form of surface coating process, as now practiced, it necessarily requires an extra procedural step of dipping, painting or similar process. It is therefore desirable to provide some way for applying and bonding onto the base material a surface coating which will not undergo folding and wrinkling of the sheet material but will be entirely smooth, and to do so as a part of the molding process.

Further, in securing certain unusual or special decorative effects in molding various products, it is desirable to grain, etch or otherwise mark the mold surface and thus cause the pattern of such marking to be place onto the surface of the molded article. To effect such procedure with respect to a laminated plastic it is desirable that a smooth and non-fibrous material contact the mold to receive the impression therefrom, for the materials from which laminated plastics are ordinarily made are not sufficiently pleasing in appearance to lend themselves well to the decorative uses with which this practice is normally associated. Hence it is desirable to surround

2 the laminated plastic body of the finished product with a coating of smooth and opaque material which will conceal the laminated plastic material and itself have a desirably attractive appearance and which can receive the patterns cut, etched, or otherwise provided in the surface of the mold.

Accordingly, it is a major object of my invention to provide a method and apparatus for practicing said method for applying a layer of coating material to a mold surface prior to the main molding operation, which will be both rapid and automatic in operation and which will effect a smooth, controllable and uniform result.

It is a further obect of my invention to provide a method, and means for practicing said method, which can be practiced on standard compression molding equipment with relatively few alterations therein.

A further obect of my invention is to provide a method as aforesaid which is capable of being practiced by equipment which will be rapid in operation and relatively simple in construction.

Other obects and purposes of my invention will be apparent to those acquainted with methods and equipment of the type herein concerned upon inspection of the accompanying drawings and reference to the following disclosure.

In the drawings:

Figure 1 represents somewhat schematically a side view of apparatus by which my invention may be practiced.

Figure 2 is a somewhat schematic plan view taken at the plane indicated by line II—II in Figure 1.

Figure 3 is a detail in longitudinal central section of one unit of the coating distributing means.

Figure 4 is a circuit diagram of a portion of the control means.

Figure 5 is a schematic side elevation of a modification of my invention.

Figure 6 is a fragmentary detail of another modification of my invention.

In providing a method for meeting the above named obectives, I create a mist of coating material between the mold parts when the mold is in open position and apply an electrostatic potential between suitable electrodes adjacent to the mist creating means and the part of said mold which it is desired to coat. This causes a deposit on said mold face of an even film of the coating material, the thickness of which will be determined by the strength of the electrostatic potential, the density of the mist and the length of time deposition continues. By proper insulation of parts of the mold, such as by painting and baking a suitable resin paint onto the surface of the mold against which no deposition is wanted, deposition can be caused to occur on whatever faces or parts of faces it is desired. With the deposition completed the mist forming equipment and electrodes associated therewith may be swung out of the way if necesssary, the preform placed in the mold and the mold closed. However, during the time interval between the deposition of the coating and the closing of the mold there will be a small amount of polymerization of the coating material on its surface adacent the mold due to residual heat in the mold body. As the mold closes, the surface of the coating away from the mold surfaces being relatively, or entirely, unpolymerized will readily become intermixed and will knit closely with the material of the mold preform so that when the molding heat and pressure are applied the coating and the molded object will be securely and firmly knitted together. The surface of the coating which lays against the mold surfaces will be polymerized slightly more than the body of the coating, by which will be provided a hard, firm coating having the same smoothness and polish as the mold surfaces themselves. This slight pre-polymerization of the coating material also helps to hold the coating material together as the mold charge is compressed into shape behind it and prevents the material of the mold charge from pushing through the coating material to the mold surface and thus destroying the completeness of the coating.

Referring now to the drawings, I there illustrate a particular mechanism for practicing the above outlined method with a mold of substantially circular shape. It should be clearly understood that this mechanism, while itself believed to be novel, is insofar as the method is concerned only one of many specific mechanisms which can be developed and utilized to practice said method, and that it can be readily applied to molds of a wide variety of shapes. Further, it should be clearly understood that since many of the individual parts of this mechanism are standard and can be readily supplied by any one acquainted with this type of equipment, the drawings and following description deal in the interest of brevity primarily with the general form and arrangement of parts and treat the details thereof only where necessary to clear understanding of the whole or where such details are believed in themselves to be novel.

In Figure 1 there is illustrated a standard hydraulically operated upstroke compression press such as a National-Erie hydraulic press, having a base 1, pillars 2, 3, 4 and 5 and a head member 6 supported by said corner members. The upper or stationary mold member 7 is removably affixed to said head member in any convenient manner but electrically insulated from it. A mold supporting table 8 is supported on the rams 9 and 10 for vertical movement into mold closing position. The mold 11 is in the usual manner removably mounted on the table 8. The usual hydraulic and control equipment will, of course, be associated with the mold mechanism.

Affixed pivotally to one corner post, as the post 2, is the coating distributing table 20 held by pivot means 21. Auxiliary supports 22 and 23 assist in the supporting of the coating distributing table 20 when it is in operative position. Any suitable means such as an hydraulic cylinder 24 operatively associated with the coating distributing table 20 by the linkage 25 may be supplied to move said table in and out of operative position. A bumper 28 may also be supplied if desired. While any other means effecting such motion, electrical, mechanical or manual, may be substituted for hydraulic means it will be somewhat preferable to use hydraulic means if otherwise convenient inasmuch as the cylinder will provide a positive holding of the table in position at each end of its stroke, and thus prevent any looseness or improper movement. If hydraulic means are used, pressure fluid may be supplied through the conduits 26 and 27 from the same source as that which actuates the rams 9 and 10 for closing the mold and also the timing mechanism for the coating table 20 may be readily integrated with the timing mechanism operating the mold itself.

The table 20 carries on it a bearing 30 in suitable register with an opening 31 through said table. Through said opening there extends a rotatable shaft 32 which may be supported rotatably in place by any suitable means such as a step in, or collar on, said shaft and bearing balls as appearing at 33 in Figure 3. Immediately below the table 20 there is supported in any convenient manner the reservoir 34 which has in its upper sheet an opening in suitable register with the opening 31 through the table 20 so that the shaft 32 can extend into said reservoir. A filling opening 35, preferably threaded, extends through both the table 20 and the upper sheet of the reservoir 34 for filling said reservoir and may be closed by a suitable closure 36 of any convenient type. A clean-out opening 37 is placed at the bottom of the reservoir and closed by a suitable closure 38 which may be threaded thereinto or otherwise affixed in any convenient manner. A pressure conduit 39 enters the reservoir 34 through a suitable fitting 40 and is connected to a source of predetermined regulatable pressure. A suitable stuffing box 41 supplied with any conventional packing is provided around the shaft 32 and affixed to the upper wall of the reservoir.

The pulley 42 is affixed to the shaft for rotation therewith for purposes appearing hereinafter.

A disk 43 is affixed in any convenient manner, as by an electrically non-conductive set screw (not shown), to the shaft 32 and is electrically insulated therefrom by a fiber bushing 44. A spray head 45 is located at the upper end of the shaft 32 and communicates with a central opening 46 in the shaft 32, which opening extends throughout the length of said shaft.

With two such units in place on the distributing table 20 as shown in Figures 1 and 2, there may be interposed between said units an electric motor 47 whose pulleys 48 are suitably belted to the respective pulleys 42 and 42a of the mist creating units. Thus by operation of the motor the said disks are caused to rotate rapidly and spread the coating material impinging on them throughout a wide area.

Although two nozzles and the associated disks are here shown for purposes of illustration, it should be understood that there may be used whatever number of these items is required for proper creation and diffusing of the desired mist of coating material. It should further be understood that although in some situations it is useful as here shown, to have the disk 43 whirl with the whirling of the shaft 32 that such is done only as a means of further scattering or diffusing the mist of coating material, and that in some other situations such whirling of the disk will be neither necessary nor desirable. In such cases the disk will merely surround the shaft 32 and may be directly mounted on, but insulated electrically from, the table 20.

Suitable means are provided (but not here shown) for energizing the motor 47, together with switching means causing the operation of said motor when the table 20 is in what may be termed its fully closed position, as shown in Figure 2, but which means will be interrupted and energization of the motor likewise interrupted as soon as said table is moved from said position toward what may be termed its open position.

An electrostatic potential is created between means adjacent the mist creating nozzles and the mold member 7, and energized in any conventional way, as by an electronic rectifier operating from an alternating current source. This source is designated in the drawings as the power pack 50 and may, alternatively, be any other convenient source of D. C. constant or pulsating potential. An acceptable electronic power pack of standard make is that made and marketed by the Westinghouse Electric and Manufacturing Company as a part of its dust precipitator which is sold under the name of "Precipitron" No. 65.

By projecting the coating spray out from the nozzles under high pressure, as will be desirable to form a fine spray, there will be sufficient frictional action between the particles to provide substantial ionization thereof. Where such ionization is sufficient to effect the hereinafter described operation, the terminals of the source of electrostatic potential may be connected on the one side to the mold member 7, insulated as aforesaid from the press frame, and on the other side to the disks 43 and 43*a* whether said disks are whirling or fixed. This will create the desired electrostatic field for operation as described below between the bottom surface of said mold and the top surface of said disks. Where, however, insufficient ionization is secured from the frictional action of the spray nozzles, and this will be the more usual case, the disks may themselves be provided with upstanding discharge points or the negative terminal of the rectifier may be connected, instead of to the said disks, to a plurality of slender filament-like corona discharge electrodes (Figure 6, numeral 60) which may surround or even replace the disks and which may be mounted on the table 20. Wherever mounted, these electrodes should be insulated from the frame of the press. This will provide ample ionization and will still create an electrostatic field having the mold as the positive electrode. The current and voltage characteristics will be as in known practice, described, for example, in a patent to Ransberg No. 2,334,648.

Figure 4 illustrates the connection of a timer 52 simultaneously energizing and deenergizing the power pack 50, the pressure valve 51 and the motor 47 at appropriate stages of the cycle, and at other stages actuating the valves controlling the rams 9 and 10 by one pair of conductors, as 53, and actuating the valves controlling the flow of fluid into and out from the conduits 26 and 27 by another pair of conductors, as 54.

*Operation*

Assuming the device is in operation the cycle may be taken to commence with the bottom mold member in lowered position and the coating distributing table 20 out of its operating position between the mold members. By suitable actuation of the hydraulic cylinder 24 the linkage 25 will be driven forward and the coating distributing table 20 moved into the position shown in Figures 1 and 2 between the mold members.

As the table reaches its closed or operating position the motor 47 commences to operate and the disks 43 and 43*a* are caused to rotate rapidly. Simultaneously with the starting of the rotation of said disks the valve 51 is opened permitting pressure fluid to flow through the conduit 39 into the reservoir 34. This operates on the coating fluid, which may be any ordinary coating material, such as melamine, within said reservoir causing it to move upwardly through the central opening 46 in the shaft 32 and out through the spray head 45. The sprayed material is thus finely divided and widely diffused throughout a zone adjacent to the face of the mold 7. It may be further diffused by the disks if and when such are used, but normally the nozzle spraying will be found sufficient. The disks if caused to whirl further assist the mechanical ionization.

Thus there is created a fine widely spread mist of coating material in the general region between the said disks and the mold member 7. Simultaneously with the closing of said distributing table 20 the power pack 50 is energized and an electrostatic potential is imposed between the said disks (or electrodes 60) and the mold member 7 of such polarity that the particles of coating material travel to and contact the surfaces of the mold member 7. By means of suitable insulation as above stated the application of said potential may be limited to certain parts of the said mold member 7, but for the purposes of this illustration it will be assumed that the entire concave area of the mold is being coated.

This will deposit on the mold surface a film of coating material which film will be deposited very rapidly and uniformly. Its uniformity is assured for the reason that the tendency for deposition will be the greatest where the film is the thinnest so that any irregularities in such deposition which might otherwise occur will be quickly removed.

While this deposition is occurring the mold preform 55 may be put in place on top of the mold member 11. Here said mold preform is assumed to be a sheet of phenolic impregnated paper approximately square in shape.

As the film of coating material is applied, the residual heat in the mold member 7 will commence the polymerization of coating material, but with the mechanism operating with reasonably rapidity this polymerization will not proceed very far nor will it penetrate to more than the outer skin of said film.

When the deposition is completed, the switch 52 is caused to open thus stopping the motor 47, closing the valve 51 and terminating the electrostatic field. Simultaneously with the occurrence of this the timer 52 through suitable conventional means not shown excepting to indicate the conductors 54, effects the flow of hydraulic actuating fluid in through the conduit 26 and out through the conduit 27 by which to withdraw the linkage 25 and thus move the coating distributing table 20 out from the position between the mold members as shown in Figures 1 and 2. As said table moves out from such position the timer 52 through the conductors 53 actuates other valves by which the rams 9 and 10 are moved upward in the usual manner and the mold closed by which the said preform and coating film are brought together. As heat is applied to said mold, likewise according to conventional practice, the mold preform 55 together with the deposited coating material already partially polymerized as above indicated will become fully polymerized and will be so polymerized in such interengaged condition. As the lower mold 11 retracts at the close of the heat and compression stage of the molding cycle, the molded article now tightly and permanently coated is removed from said mold in the usual manner and the mechanism is ready to repeat the cycle.

It will be observed that throughout the foregoing discussion it has been assumed that, while the actuating means throughout are hydraulic, the controls are electrical and in many ways it is desirable that they be so. However, in other cases it is entirely possible to substitute hydraulic or even mechanical controls, including the timing mechanism and the valves or switches operated thereby, without loss in effectiveness of operation of the machine and without departure from the principles of my invention.

Other variations may be made in the equipment herein disclosed by which to accommodate the process of mold members of different shapes and to meet different problems. For example, if the mold members are sufficiently narrow it will be possible to place the spraying equipment for coating material adjacent said members and cause deposition of coating material on the faces of either or both halves of said mold without the necessity of moving the mist creating mechanism in and out of position between said molds. This situation is illustrated schematically in Figure 5 wherein the numeral 60 indicates the mist creating mechanism and the numerals 61 and 62 indicate the two cooperating mold members. It will be evident that, as also illustrated in Figure 5, when the faces of both molds are to be coated, then the connection to the power pack will be such that both mold members are of positive polarity. If more coating material is to be deposited on one mold face than on the other, this may be controlled by suitably controlling the potential between the negative electrode and the respective mold faces, for the amount of deposition will be in proportion, other things being equal, to the potential existing between the respective electrodes of the field.

Other variations in equipment to adapt the mechanism to various problems, or specific applications, will be apparent to persons acquainted with processes and equipment of this general type but such variations will be within the scope of my hereinafter appended claims excepting as such claims expressly provide otherwise.

I claim:

1. In a method of applying a coating to a molded article by applying a film of coating material to a surface of the mold prior to the insertion of a mold preform into the mold, the improvement comprising: while said mold is in open position interposing between said mold parts a means for sub-dividing and ionizing the coating material; creating in a zone adjacent to a mold face a plurality of relatively small ionized sub-divisions of the coating material; creating around said zone an electrostatic field of which one terminal is the mold face upon which coating material is to be placed; permitting said sub-divisions of coating material to be deposited upon said mold face by electrostatic attraction in a selected quantity, removing said sub-dividing and ionization means.

2. In a method of applying a coating to a molded article by applying a film of coating material to a surface of the mold prior to the insertion of a mold preform into the mold, the improvement comprising: while said mold is in open position interposing between said mold parts a means for sub-dividing and ionizing the coating material; creating in a zone adjacent to a mold face a plurality of relatively small ionized sub-divisions of the coating material; creating within said zone an electrostatic field of which one terminal is the mold face upon which coating material is to be placed; permitting said sub-divisions of coating material to be deposited upon said mold face by electrostatic attraction in a selected quantity; terminating the deposition of coating material upon the surface of the mold, inserting the mold charge and closing the mold, removing said sub-dividing and ionization means.

3. A method of precoating a mold surface prior to the placing therein of a mold preform, comprising: while said mold is in open position interposing between said mold parts means creating a mist of said coating material and ionizing the particles thereof; utilizing a portion of said mist creating means as one terminal and utilizing the mold whose surface is to be coated as another terminal and imposing an electrostatic potential between said terminals; continuing the creation of said mist and maintaining said potential until the desired quantity of said coating material is deposited onto the mold; stopping the creating of said mist and substantially simultaneously terminating said potential.

4. In means for depositing a layer of material onto the surface of a mold, the combination comprising: a pair of molds, one of which is movable toward and away from the other for opening and closing thereof; a table movable into an out from operating position between said mold parts when same are in open position; a reservoir holding liquid coating material carried on and by said table and means including a whirling disk receiving coating material from said reservoir and creating a mist thereof in the region of one of said mold members; a source of direct current potential of which the positive side is connected to the said mold member and the negative side is connected to a corona discharge electrode positioned in the zone occupied by said mist; whereby at least a portion of the particles comprising said mist are negatively charged and an electrostatic potential is created between said electrode and the surface of said mold, and wherein such potential is of such polarity that the particles comprising said mist are caused to move toward and become deposited on said surface of said mold.

5. In means for depositing a layer of material onto the surface of a mold, the combination comprising: a pair of molds, one of which is movable toward and away from the other for opening and closing thereof; a table movable into and out from operating position between said mold parts when same are in open position and means effecting such movement; a reservoir holding liquid coating material carried on and by said table and means receiving coating material from said reservoir and creating a mist thereof in the region of one of said mold members; pressure means effecting flow of coating material for the reservoir to mist creating means; a source of direct current potential of which one side is connected to one of said mold members and the other side is connected to an electrode spaced from said last named mold member; whereby the mist particles are at least in part ionized, wherein an electrostatic potential is created between said electrode and the surface of said mold member, and wherein such potential is of such polarity that the particles comprising said mist are caused to move toward and become deposited on said surface of said mold.

6. In means for depositing a layer of material on to the surface of a mold, the combination comprising: a pair of mold members, at least one of which is movable toward and away from the other for opening and closing thereof; a means movable into and out from operating position between said mold members when same are in open position and means effecting such movement; a reservoir holding liquid coating material and means receiving coating material from said reservoir and creating a mist thereof in the region of at least one of said mold members; an electrode spaced from said mold member; a source of direct current potential of which one side is connected to said mold member and the other side is connected to said electrode; whereby the mist particles are at least in part ionized, wherein an electrostatic potential is created between said electrode and the surface of said mold member and wherein said potential is of such polarity that the particles comprising said mist are caused to move toward and become deposited on said surface of said mold member.

7. In a means for depositing a layer of material onto the surface of a mold, the combination comprising: a pair of mold members, at least one of which is movable toward and away from the other for opening and closing thereof; a material mist creating means and an electrostatic potential means each movable into and out from operating position between said mold members when same are in open position and means effecting such movement; a reservoir holding liquid coating material and means receiving said coating material from said reservoir and transmitting it to said material mist creating means; an electrode spaced away from the mold member onto which said layer of material is to be deposited; a source of direct current potential of which one side is connected to said mold member and the other side is connected to said electrode; whereby the mist particles are at least in part ionized, wherein the electrostatic potential is created between said electrode and the surface of said mold member, and wherein said potential is of such polarity that the particles comprising said mist are caused to move toward and become deposited on said surface of said mold member.

8. In means for depositing a layer of material onto the surface of a mold, the combination comprising: a pair of mold members, at least one of which is movable toward and away from the other for opening and closing thereof; a means movable into and out from operating position between said mold members when same are in open position and means effecting such movement; a source of liquid coating material and means receiving coating material from said source and creating a mist thereof in the region of at least one of said mold members; an electrode spaced from said one of said mold members a source of direct current potential of which one side is connected to said mold member and the other side is connected to said electrode; whereby the mist particles are at least in part ionized, wherein the electrostatic potential is created between said electrodes and the surface of said mold member, and wherein such potential is of such polarity that the particles comprising said mist are caused to move toward and become deposited on said surface of said mold member.

9. A means for depositing a layer of material onto the surface of a mold, the combination comprising: a pair of mold members, at least one of which is movable toward and away from the other for opening and closing thereof; a means movable into and out from operating position between said mold members when same are in open position and means effecting such movement; a reservoir holding liquid coating material and means receiving coating material from said reservoir and creating a mist thereof in the region of one of said mold members; pressure means effecting flow of coating material from the reservoir to the mist creating means; an electrode spaced from said one of said mold members a source of direct current potential of which one side is connected to said mold member and the other side is connected to said electrode; whereby the mist particles are at least in part ionized, wherein the electrostatic potential is created between said electrode and the surface of said mold member, and wherein such potential is of such polarity that the particles comprising said mist are caused to move toward and become deposited on said surface of said mold member.

10. In a method of applying a coating to a molded article by applying a film of coating material to a surface of at least one part of a two part mold prior to the insertion of a mold preform between the mold parts, said mold having an operating cycle involving separation and convergence of said mold parts, the improvement comprising: while the mold is in the position of separation of its cycle creating between the mold parts and in a zone adjacent to the face of at least one part of the mold a plurality of relatively small ionized sub-divisions of the coating material; creating around said zone an electrostatic field of which one terminal is the mold face upon which coating material is to be placed; permitting said sub-divisions of coating material to be deposited upon said mold face by electrostatic attraction in selected quantity.

THOMAS J. ARBRON.

REFERENCES CITED

The following references are of record in the file of this patent:

UNITED STATES PATENTS

| Number | Name | Date |
|---|---|---|
| 1,094,828 | Aylsworth | Apr. 28, 1914 |
| 2,334,648 | Ransburg et al. | Nov. 16, 1943 |